(12) United States Patent
Morioka et al.

(10) Patent No.: US 8,995,330 B2
(45) Date of Patent: Mar. 31, 2015

(54) BASE STATION, RELAY STATION AND METHOD IN MOBILE COMMUNICATION SYSTEM

(75) Inventors: Yasufumi Morioka, Tokyo (JP); Akira Yamada, Tokyo (JP); Junichiro Hagiwara, Tokyo (JP); Hideaki Takahashi, Tokyo (JP); Mikio Iwamura, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 242 days.

(21) Appl. No.: 13/816,944

(22) PCT Filed: Aug. 10, 2011

(86) PCT No.: PCT/JP2011/068322
§ 371 (c)(1),
(2), (4) Date: Apr. 9, 2013

(87) PCT Pub. No.: WO2012/023478
PCT Pub. Date: Feb. 23, 2012

(65) Prior Publication Data
US 2013/0201897 A1    Aug. 8, 2013

(30) Foreign Application Priority Data
Aug. 16, 2010    (JP) ................................. 2010-181912

(51) Int. Cl.
| H04B 7/14   | (2006.01) |
| H04W 72/00  | (2009.01) |
| H04B 7/155  | (2006.01) |
| H04W 72/04  | (2009.01) |
| H04W 36/00  | (2009.01) |
| H04W 84/04  | (2009.01) |
| H04W 12/04  | (2009.01) |

(52) U.S. Cl.
CPC ............. *H04W 72/005* (2013.01); *H04B 7/155* (2013.01); *H04W 72/042* (2013.01); *H04W 84/047* (2013.01); *H04W 36/0038* (2013.01); *H04W 12/04* (2013.01)
USPC ............................ 370/315; 370/330; 370/331

(58) Field of Classification Search
CPC .............................. H04W 88/04; H04W 24/02
USPC .......... 370/328, 329, 330, 331, 312, 315, 252
See application file for complete search history.

(56) References Cited

U.S. PATENT DOCUMENTS

| 8,804,597 B2 * | 8/2014 | Won et al. ...................... 370/315 |
| 2011/0134827 A1 * | 6/2011 | Hooli et al. ................... 370/315 |
| 2013/0090055 A1 * | 4/2013 | Pitakdumrongkija et al. .... 455/9 |

OTHER PUBLICATIONS

International Search Report issued in PCT/JP2011/068322 mailed Nov. 15, 2011 (2 pages).

(Continued)

*Primary Examiner* — Kwang B Yao
*Assistant Examiner* — Ricardo Castaneyra
(74) *Attorney, Agent, or Firm* — Osha Liang LLP

(57) ABSTRACT

A base station generates first setting information commonly used for establishing a logical path for communication with a user apparatus and for establishing a logical path for communication with a relay station, and second setting information used only for establishing the logical path for communication with the relay station, and transmits a second RRC message including the second setting information to the relay station after transmitting a first RRC message including the first setting information to the relay station. The first setting information includes information indicating a priority of a radio bearer in the logical path, information indicating usage of resources in SPS, information indicating resources of SRS, configuration information in a MAC sublayer, and information on change of a security encryption key in handover, and the second setting information includes at least system information and MBSFN information.

5 Claims, 7 Drawing Sheets

(56) References Cited

OTHER PUBLICATIONS

Written Opinion issued in PCT/JP2011/068322 mailed Nov. 15, 2011 (3 pages).

ETSI MCC; "Report of 3GPP TSG RAn WG2 meeting #69"; TSG-RAN Working Group 2 meeting #69, R2-101978; Beijing, China; Apr. 12-16, 2010 (181 pages).

* cited by examiner

US 8,995,330 B2

BASE STATION, RELAY STATION AND METHOD IN MOBILE COMMUNICATION SYSTEM

TECHNICAL FIELD

The present invention relates to a base station, a relay station and a method.

BACKGROUND ART

In a cellular mobile communication system, in order to enlarge coverage of a cell and/or in order to realize load distribution in a base station (eNB), there is a case where a relay station (relay node: RN) is provided between the base station (eNB) and a mobile station (more generally, user apparatus (UE)). The base station (eNB) in this case functions as a parent station, and may be referred to as a donor base station (donor eNodeB: DeNB). Although the user apparatus (UE) is a mobile station typically, it may be a fixed station. The user apparatus (UE) may be any proper apparatus such as a mobile phone, an information terminal, a smart phone, a personal digital assistant, and a mobile personal computer. A radio interface between the base station (eNB) and the relay station (RN) is referred to as "Un". A radio interface between the relay station (RN) and the mobile station (UE) is referred to as "RN-Un".

In order to perform radio communication with the base station (eNB), it is necessary to properly establish a radio bearer or a logical path after it becomes possible to access the base station (eNB) by receiving a notification signal from the base station (eNB). That is, it is necessary to adapt various parameters in each sublayer such as RLC, MAC, and PDCP sublayer to the base station (eNB). Setting of the logical path needs to be carried out not only by the user apparatus (UE) but also by the relay station (RN). In this case, setting of the logical path of the user apparatus (UE) and setting of the logical path of the relay station (RN) are different at least partially.

For example, the relay station (RN) uses the time division duplex (TDD) scheme in order to realize reception from the base station (eNB) and transmission to the user apparatus (UE) by half duplex scheme using the same frequency. In this case, it is necessary that the relay station (RN) receives a signal from the base station (eNB) by using a subframe that can be configured to transmit MBSFN (Multimedia Broadcast multicast service Single Frequency Network). On the other hand, there is no such restriction for the user apparatus (UE). Therefore, setting of the logical channel is different between the relay station (RN) and the user apparatus (UE) at least with respect to usage of the subframe. Other than the setting of the subframe, there is a possibility that there are differences in settings of information indicating usage of resources in semi-persistent scheduling (SPS), information indicating resources of a sounding reference signal (SRS), and configuration information in MAC sublayer, for example.

Therefore, it is necessary that the base station (eNB) provides information for establishing (setting) the logical path for the relay station (RN) and the user apparatus (UE). According to a 3GPP standard specification discussed before filing the present application, it is studied that the base station (eNB) transmits an individual RRC message including setting information common to the user apparatus (UE) and the relay station (RN), and an individual RRC message including setting information dedicated to the relay station (RN) (for this technique, please refer to non-patent document 1, for example).

PRIOR ART DOCUMENT

[Non-patent document 1] Report of 3GPP TSG RAN WG2 meeting #69, R2-101978

SUMMARY OF THE INVENTION

Problem to be Solved by the Invention

However, it is not decided how the base station reports, to the relay station, setting information of the logical path necessary for the relay station in detail.

An object of the present invention is to properly report, from the base station to the relay station, setting information of the logical path necessary for the relay station that communicates with the base station and the user apparatus.

Means for Solving the Problem

A base station of an embodiment of the present invention is a base station in a mobile communication system, including:

a generation unit configured to generate first setting information commonly used for establishing a logical path for communication with a user apparatus and for establishing a logical path for communication with a relay station, and second setting information used only for establishing the logical path for communication with the relay station; and a transmission unit configured to transmit an individual second RRC message including the second setting information to the relay station after transmitting an individual first RRC message including the first setting information to the relay station, wherein the first setting information includes at least information indicating a priority of a radio bearer in the logical path, information indicating usage of resources in semi-persistent scheduling, information indicating resources of a sounding reference signal, configuration information in a MAC sublayer, and information on change of a security encryption key in handover, and the second setting information includes at least system information reported to the user apparatus and information indicating a subframe for MBSFN.

Effect of the Present Invention

According to an embodiment of the present invention, it becomes possible is to properly report, from the base station to the relay station, setting information of a logical path necessary for the relay station that communicates with the base station and the user apparatus.

EMBODIMENTS FOR CARRYING OUT THE INVENTION

Figure 1:
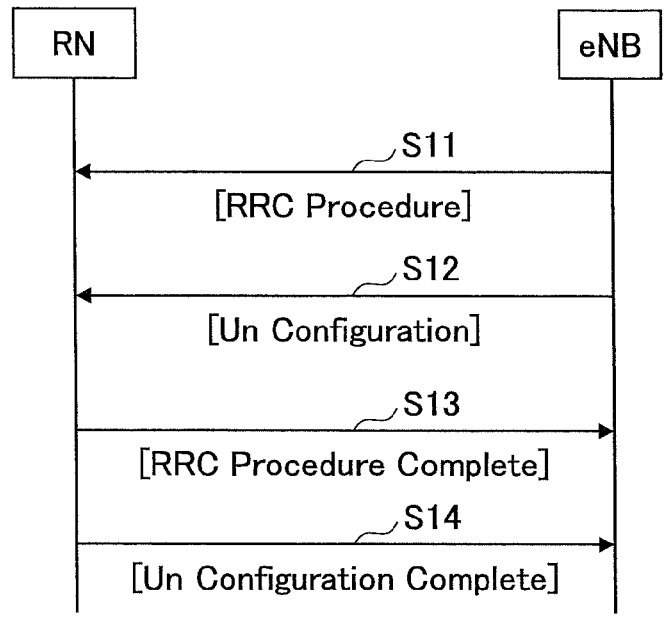
FIG. 1 is a diagram of a sequence performed between a base station (eNB) and a relay station (RN) when reporting given setting information to the relay station (RN)

Next, embodiments are described from the viewpoint of the following aspects.
1. Setting order
2. A case where setting fails
2.1 Reconnection request for each message
2.2 Reconnection request as a whole
2.3 Reconnection request when updating
2.4 Operation flow
3. Setting items
4. Base station (eNB) and relay station (RN)

Embodiment 1

1. Setting Order

FIG. 1 shows a sequence performed between the base station (eNB) and the relay station (RN) when reporting given setting information to the relay station (RN).

In step S11, the base station (eNB) transmits, to the relay station (RN), first setting information common to the user apparatus (UE) and the relay station (RN) by using an individual first RRC message. In the figure, "RRC Procedure" indicates that the procedure using the first RRC message is a procedure for setting an RRC connection such as an RRC connection reconfiguration message. More particularly, the first setting information includes information indicating a priority of a radio bearer by a logical path, information indicating usage of resources in semi-persistent scheduling (SPS), information indicating resources of the sounding reference signal (SRS), and configuration information in a MAC sublayer and the like. But, the first setting information is not limited to these pieces of information. For example, information on change of a security encryption key in handover may be included in the first setting information. Although not shown in the figure, the relay station (RN) establishes a logical path according to the first setting information so as to be able to communicate with the base station (eNB) like the user apparatus (UE).

In step S12, the base station (eNB) transmits, to the relay station (RN), second setting information dedicated to the relay station (RN) by using an individual second RRC message. In the figure, "Un Configuration" indicates that the second setting information is related to configuration of the relay station (RN). There is no conventional RRC procedure corresponding to this procedure using the second RRC message. The second setting information includes, for example, system information reported to the user apparatus and information indicating a subframe for MBSFN. But, the second setting information is not limited to these pieces of information. Although not shown in the figure, the relay station (RN) establishes a logical path according to the second setting information in addition to the first setting information so as to be able to communicate with the base station (eNB) as a relay station (RN).

In step S13, the relay station (RN) reports, to the base station (eNB), that the relay station (RN) has properly received the first RRC message in step S11 by using an RRC Procedure Complete message.

In step S14, the relay station (RN) reports, to the base station (eNB), that the relay station (RN) has properly received the second RRC message in step S12 by using a Un Configuration Complete message.

According to the procedure shown in the figure, after the base station (eNB) transmits the first RRC message in step S11, the base station (eNB) transmits the second RRC message in step S12 without waiting for reception of a response message (RRC Procedure Complete) for the first RRC message. Therefore, the relay station (RN) can receive the first and the second RRC messages quickly and can make settings as a relay station promptly.

Figure 2:
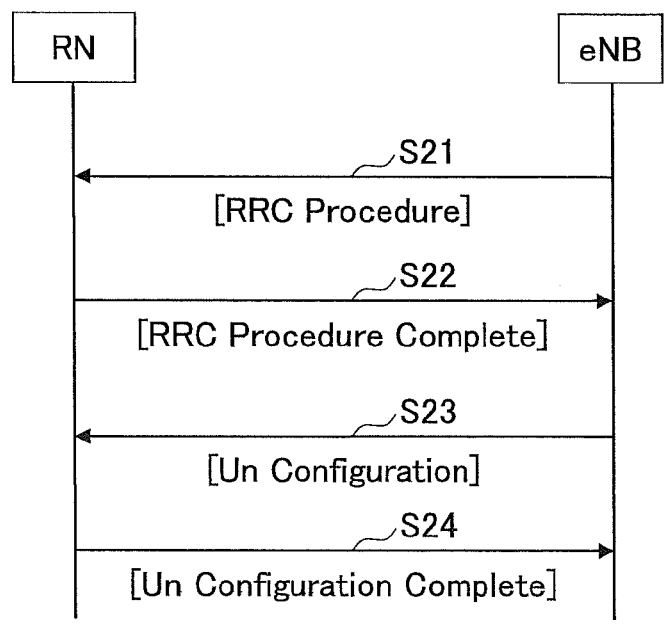
FIG. 2 is a diagram of another sequence performed between the base station (eNB) and the relay station (RN) when reporting given setting information to the relay station (RN)

FIG. 2 shows another sequence performed between the base station (eNB) and the relay station (RN) when reporting given setting information to the relay station (RN).

In step S21, the base station (eNB) transmits, to the relay station (RN), first setting information common to the user apparatus (UE) and the relay station (RN) by using an individual first RRC message. This corresponds to the procedure of step S11 in FIG. 1. Although not shown in the figure, the relay station (RN) establishes a logical path according to the first setting information so as to be able to communicate with the base station (eNB) like the user apparatus (UE).

In step S22, the relay station (RN) reports, to the base station (eNB), that the relay station (RN) has properly received the first RRC message in step S21 by using an RRC Procedure Complete message. It should be noted that the order of the sequence is different from that shown in FIG. 1 in this point.

In step S23, the base station (eNB) transmits, to the relay station (RN), second setting information dedicated to the relay station (RN) by using an individual second RRC message. This step corresponds to the procedure of step S12 in FIG. 1. Although not shown in the figure, the relay station (RN) establishes a logical path according to the second setting information in addition to the first setting information so as to be able to communicate with the base station (eNB) as a relay station (RN).

In step S24, the relay station (RN) reports, to the base station (eNB), that the relay station (RN) has properly received the second RRC message in step S23 by using a Un Configuration Complete message.

According to the procedure shown in FIG. 2, after the base station (eNB) transmits the first RRC message in step S21, the base station (eNB) receives the response massage (RRC Procedure Complete) for the first RRC message in step S22. After that, the base station (eNB) transmits the second RRC message in step S23. Therefore, the time when the relay station (RN) can receive both of the first and the second RRC messages is later than the case of the sequence of FIG. 1. However, in the sequence of FIG. 2, in a case when the response signal (RRC Procedure Complete) for the first RRC message does not arrive at the base station (eNB), the base station (eNB) can avoid wasteful transmission of the second RRC message. This point is advantageous.

Figure 3:
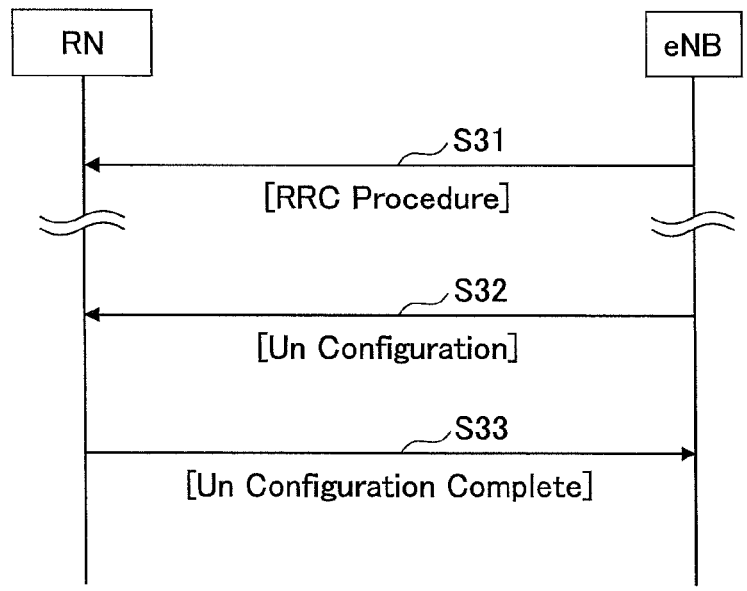
FIG. 3 is a diagram of another sequence performed between the base station (eNB) and the relay station (RN) when reporting given setting information for updating to the relay station (RN)

FIG. 3 shows another sequence performed between the base station (eNB) and the relay station (RN) when reporting given setting information to the relay station (RN). FIGS. 1 and 2 correspond to sequences when the relay station (RN) is launched, and FIG. 3 corresponds to a sequence while the relay station (RN) is operating after the relay station (RN) is launched.

In step S31, the base station (eNB) transmits, to the relay station (RN), first setting information common to the user apparatus (UE) and the relay station (RN) by using an individual first RRC message. This step corresponds to the procedure of step S11 of FIG. 1. Although not shown in the figure, the relay station (RN) establishes a logical path according to the first setting information so as to be able to communicate with the base station (eNB) like the user apparatus (UE). After that, procedures described with reference to FIG. 1 or FIG. 2 are performed, so that the relay station (RN) establishes a logical path according to the second setting information in addition to the first setting information so as to be able to communicate with the base station (eNB) as a relay station (RN). After that, it is assumed that second setting information required for the relay station (RN) to function as a relay station (RN) is updated in the base station (eNB).

In step S32, the base station (eNB) transmits the updated second setting information to the relay station (RN) by using an individual second RRC message. The relay station (RN) establishes a logical path according to the updated second setting information so that the relay station (RN) is able to communicate with the base station (eNB) as a proper relay station (RN).

In step S33, the relay station (RN) reports, to the base station (eNB), that the relay station (RN) has properly received the second RRC message in step S32 by using a Un Configuration Complete message.

As mentioned above, in the case where the second setting information is updated in the base station (eNB), the relay station (RN) receives the updated second setting information so that the relay station (RN) can efficiently establish the logical path having updated settings. If the relay station (RN) does not perform such an updating procedure, there is a fear that a radio link cannot be properly maintained between the base station (eNB) having the updated new settings and the relay station (RN) having old settings.

As described with reference to FIGS. 1-3, first, the base station (eNB) transmits, to the relay station (RN), the first setting information that is common to the user apparatus (UE) and the relay station (RN) by using the individual first RRC message. By establishing a logical path according to the first setting information, it becomes possible that the relay station (RN) can communicate with the base station (eNB) in the same way as the user apparatus (UE).

Next, the base station (eNB) transmits, to the relay station (RN), the second setting information that is dedicated to the relay station (RN) by using the individual second RRC message. By re-establishing a logical path according to the second setting information in addition to the first setting information, the relay station (RN) can communicate with the base station (eNB) as a relay station (RN).

If the logical path is re-established according to the first setting information after establishing the logical path according to the second setting information, there is a fear that the relay station (RN) cannot properly operate as a relay station (RN) since settings dedicated to the relay station (RN) are changed to settings common to the relay station (RN) and the user apparatus (UE). In addition, the relay station (RN) needs to receive a signal from the base station (eNB) by using subframes (for example, one or more of #1, #2, #3, #6, #7, #8) that can be configured as MBSFN in a radio frame including 10 subframes, for example (there is no such restriction in the user apparatus (UE)). Therefore, if this setting is made first, the relay station (RN) needs to receive a signal from the base station (eNB) in limited subframes equal to or less than 6, so that there is a fear that the time of completion of setting is delayed. Therefore, it is preferable to establish the logical path according to the second setting information dedicated to the relay station (RN) after establishing the logical path according to the first setting information common to the user apparatus (UE) and the relay station (RN), and to update the second setting information as necessary.

2. In a Case Where Setting Fails

<<2.1 Reconnection Request for Each Message>>

As described with reference to FIGS. 1-3, the relay station (RN) establishes the logical path by properly receiving the first RRC message (RRC Procedure) and the second RRC message (Un Configuration) so that the relay station (RN) can function as a relay station (RN). Therefore, in a case where both or one of the first and the second RRC messages cannot be properly received, the relay station (RN) cannot function as a proper relay station (RN). In such a case, in the following example, the relay station (RN) can urge the base station (eNB) to retransmit the first and the second RRC messages by using an RRC message for reconnection.

Figure 4:
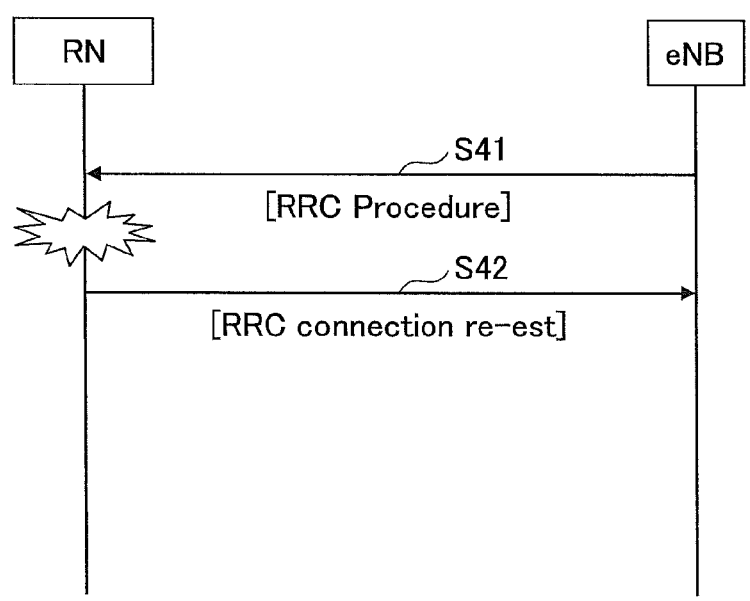
FIG. 4 is a diagram of a sequence performed between the base station (eNB) and the relay station (RN)

FIG. 4 shows a sequence performed between the base station (eNB) and the relay station (RN). In step S41, the base station (eNB) transmits, to the relay station (RN), first setting information common to the user apparatus (UE) and the relay station (RN) by using an individual first RRC message. This corresponds to the procedure of step S11 in FIG. 1. However, it is assumed that the relay station (RN) cannot properly set the first setting information for some reason. For example, it can be considered that all or a part of pieces of setting information are lost due to fading.

In step S42, the relay station (RN) transmits an RRC message for reconnection (RRC connection re-establishment) to the base station (eNB). Although not shown in the figure, when the base station (eNB) receives the RRC message for reconnection (RRC connection re-est), the base station (eNB) retransmits the first setting information by using the first RRC message (RRC Procedure).

Figure 5:
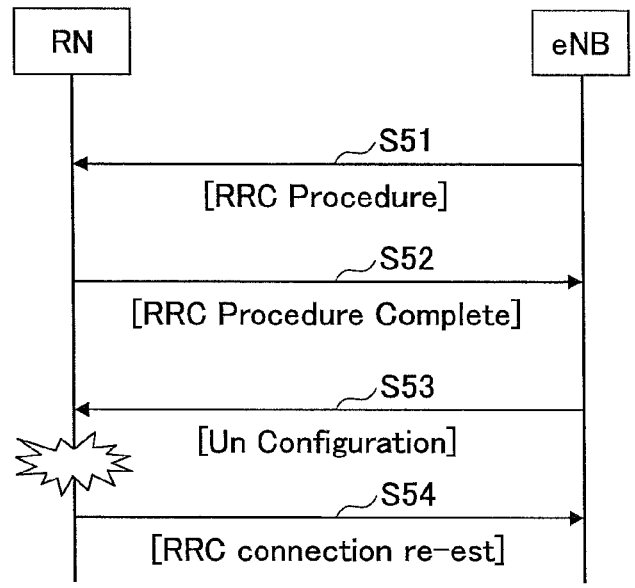
FIG. 5 is a diagram of another sequence performed between the base station (eNB) and the relay station (RN)

FIG. 5 shows another sequence performed between the base station (eNB) and the relay station (RN). In step S51, the base station (eNB) transmits, to the relay station (RN), first setting information common to the user apparatus (UE) and the relay station (RN) by using an individual first RRC message. This corresponds to the procedure of step S11 in FIG. 1. Although not shown in the figure, the relay station (RN) establishes a logical path according to the first setting information so as to be able to communicate with the base station (eNB) like the user apparatus (UE).

In step S52, the relay station (RN) reports, to the base station (eNB), that the relay station (RN) has properly received the first RRC message in step S51 by using an RRC Procedure Complete message.

In step S53, the base station (eNB) transmits, to the relay station (RN), second setting information dedicated to the relay station (RN) by using an individual second RRC message. This corresponds to the procedure of step S12 in FIG. 1. However, it is assumed that the relay station (RN) cannot properly set the second setting information for some reason. For example, it can be considered that all or a part of pieces of the setting information are lost due to fading.

In step S54, the relay station (RN) transmits an RRC message for reconnection (RRC connection re-establishment) to the base station (eNB). Although not shown in the figure, when the base station (eNB) receives the RRC message for reconnection (RRC connection re-est), the base station (eNB) retransmits the first setting information by using the first RRC message (RRC Procedure). The second RRC message (Un Configuration) in step S53 is a message that does not exist in a conventional sequence. Thus, it should be noted that the RRC message for reconnection (RRC connection re-est) is also a message that does not exist in a conventional sequence, in which the RRC message for reconnection is transmitted in step S54 in response to the event that the second RRC message cannot be properly received.

In the cases of the examples shown in FIGS. 4 and 5, the RRC message for reconnection (RRC connection re-est) is transmitted as necessary for each of the first RRC message (RRC Procedure) and the second RRC message (Un Configuration). Therefore, the base station that receives the RRC message for reconnection (RRC connection re-est) can identify which one of the first and the second RRC messages cannot be properly received. For example, in a case where the base station (eNB) receives the RRC message for reconnection (RRC connection re-est) instead of the response signal (RRC Procedure Complete) for the first RRC message, the base station (eNB) can retransmit the first RRC message quickly without transmitting the second RRC message wastefully.

<<2.2 Request Retransmission Collectively>>

Figure 6:
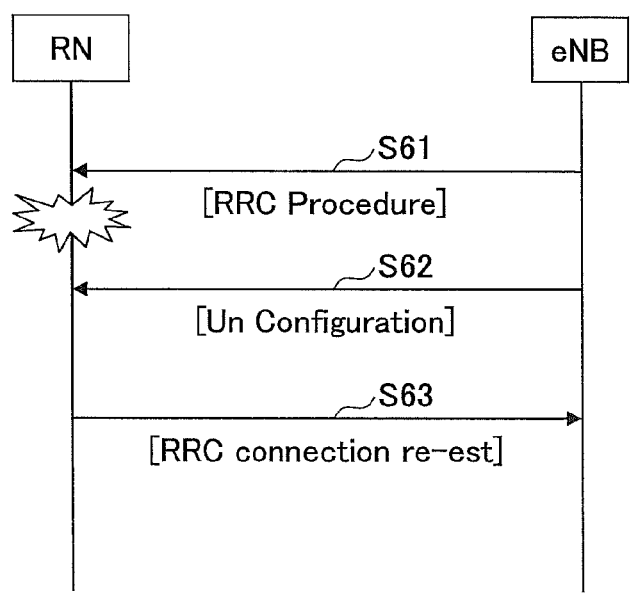
FIG. 6 is a diagram of another sequence performed between the base station (eNB) and the relay station (RN)

FIG. 6 shows another sequence performed between the base station (eNB) and the relay station (RN). In step S61, the base station (eNB) transmits, to the relay station (RN), first setting information common to the user apparatus (UE) and the relay station (RN) by using an individual first RRC message. This corresponds to the procedure of step S11 in FIG. 1. However, it is assumed that the relay station (RN) cannot properly set the first setting information for some reason. For example, it can be considered that all or a part of pieces of setting information are lost due to fading.

In the sequence of FIG. 6, different from the sequence of FIG. 4, in step S62, the base station (eNB) transmits, to the relay station (RN), the second setting information dedicated to the relay station (RN) by using the individual second RRC message (Un Configuration). That is, the base station (eNB) transmits the second RRC message (Un Configuration) to the relay station (RN), irrespective of whether the base station (eNB) receives the response signal (RRC Procedure Complete) from the relay station (RN) for the first RRC message (RRC Procedure).

In step S63, the relay station (RN) transmits an RRC message for reconnection (RRC connection re-establishment) to the base station (eNB). Although not shown in the figure, when the base station (eNB) receives the RRC message for reconnection (RRC connection re-est), the base station (eNB) retransmits the first RRC message (RRC Procedure) and the second RRC message (Un Configuration).

Figure 7:
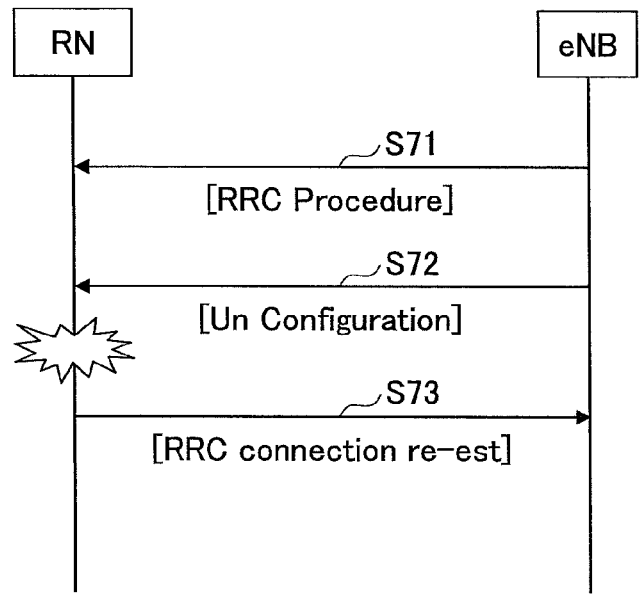
FIG. 7 is a diagram of another sequence performed between the base station (eNB) and the relay station (RN)

FIG. 7 shows a sequence performed between the base station (eNB) and the relay station (RN). The sequence is similar to the sequence of FIG. 6 in general, but they are different in the time at which reception fails.

In step S71, the base station (eNB) transmits, to the relay station (RN), the first setting information common to the user apparatus (UE) and the relay station (RN) by using an individual first RRC message. This corresponds to the procedure of step S11 in FIG. 1.

In step S72, the base station (eNB) transmits the second setting information dedicated to the relay station (RN) by using an individual second RRC message. That is, the base station (eNB) transmits the second RRC message to the relay station (RN) irrespective of whether the base station (eNB) receives the response signal (RRC Procedure Complete) from the relay station (RN) for the first RRC message. However, it is assumed that the relay station (RN) cannot properly set the second setting information for some reason. For example, it can be considered that all or a part of pieces of setting information are lost due to fading.

In step S73, the relay station (RN) transmits an RRC message for reconnection (RRC connection re-establishment) to the base station (eNB). Although not shown in the figure, when the base station (eNB) receives the RRC message for reconnection (RRC connection re-est), the base station (eNB) retransmits the first RRC message (RRC Procedure) and the second RRC message (Un Configuration).

In the cases of the examples shown in FIGS. 6 and 7, the relay station (RN) transmits the RRC message for reconnection (RRC connection re-est) after the second RRC message that is after the first RRC message. Therefore, the RRC message for reconnection (RRC connection re-est) is transmitted only once for the two first and second RRC messages. In this point, sequences of FIGS. 6 and 7 are different from the sequences of FIGS. 4 and 5 in which the RRC message for reconnection (RRC connection re-est) is transmitted as necessary for each of the first and the second RRC messages.

<<2.3 Retransmission Request when Updating>>

Figure 8:
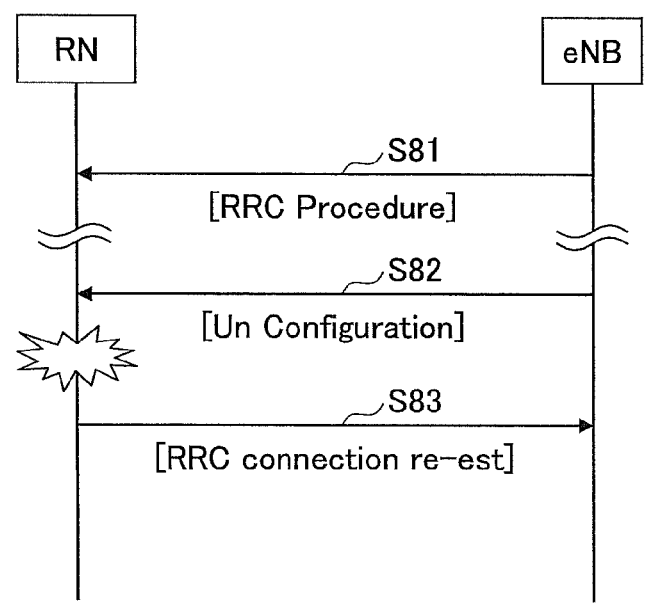
FIG. 8 is a diagram of another sequence performed between the base station (eNB) and the relay station (RN)

FIG. 8 shows another sequence performed between the base station (eNB) and the relay station (RN). FIGS. 4-7 correspond to sequences when the relay station (RN) is launched, and FIG. 8 corresponds to a sequence while the relay station (RN) is operating after it is launched.

In step S81, the base station (eNB) transmits, to the relay station (RN), the first setting information common to the user apparatus (UE) and the relay station (RN) by using an individual first RRC message. This corresponds to the procedure of step S11 in FIG. 1. Although not shown in the figure, the relay station (RN) establishes a logical path according to the first setting information so that the relay station (RN) can communicate with the base station (eNB) like the user apparatus (UE). After that, procedures described in FIG. 1 or FIG. 2 are performed, and the relay station (RN) can communicate with the base station (eNB) as a relay station (RN) by establishing a logical path according to the second setting information. After that, it is assumed that the second setting information necessary for the relay station (RN) to function as a relay station (RN) is updated in the base station (eNB).

In step S82, the base station (eNB) transmits the second setting information dedicated to the relay station (RN) by using an individual second RRC message. This corresponds to the procedure of step S12 in FIG. 1. However, it is assumed that the relay station (RN) cannot properly set the second setting information for some reason. For example, it can be considered that all or a part of pieces of setting information are lost due to fading.

In step S83, the relay station (RN) transmits the RRC message for reconnection (RRC connection re-establishment) to the base station (eNB). Although not shown in the figure, when the base station (eNB) receives the RRC message for reconnection (RRC connection re-est), the base station (eNB) retransmits updated second setting information by using a second RRC message (Un Configuration).

As described with reference to FIGS. 4-8, in a case where the relay station (RN) fails to receive the first RRC message (RRC Procedure) and/or the second RRC message (Un Configuration), the relay station (RN) transmits the RRC message for reconnection (RRC connection re-est) to the base station (eNB). Accordingly, the base station (eNB) can retransmit the first and the second RRC messages to the relay station (RN).

<<2.4 Operation Flow>>

Figure 9:
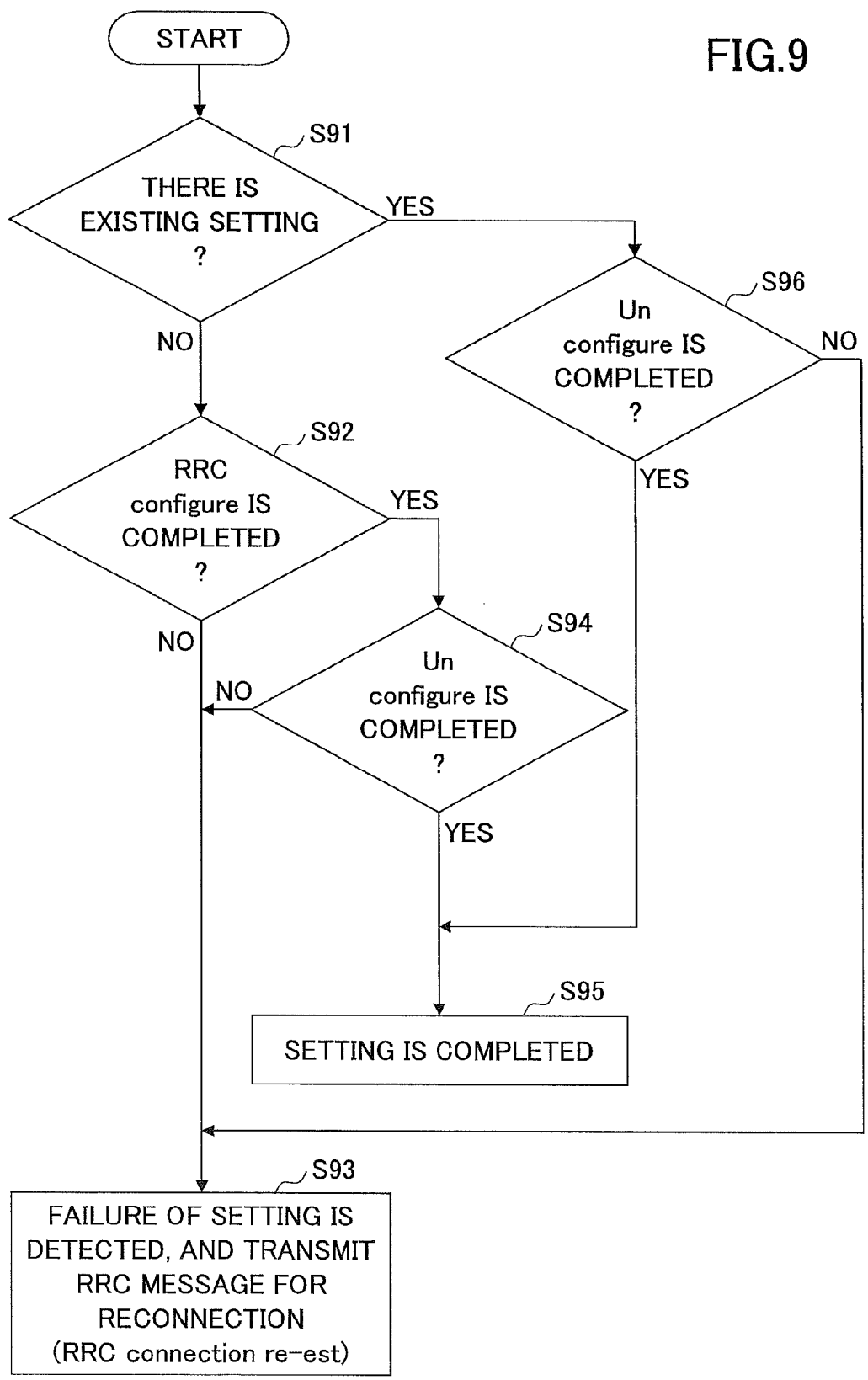
FIG. 9 is a flowchart showing operation in the relay station (RN)

FIG. 9 is a flowchart for explaining operation described with reference to FIGS. 4-8 from the viewpoint of the relay station (RN).

In step S91, the relay station (RN) determines whether there are existing settings of the first RRC message (RRC Procedure) and the second RRC message (Un Configuration). When the determination is No, since there are no existing settings, this operation corresponds to operation when the relay station (RN) is launched. Thus, the flow goes to step S92. When the determination is Yes, since there are the existing settings, this operation corresponds to operation when updating. Thus, the flow goes to step S96.

In step S92, the relay station (RN) determines whether setting by the first RRC message (RRC Procedure) is completed. When the setting has not been completed, the flow goes to step S93.

In step S93, due to failure of the setting, the relay station (RN) transmits an RRC message for reconnection (RRC connection re-est) to the base station (eNB). This step corresponds to step S42 of FIG. 4 and step S63 of FIG. 6. After that, the base station (eNB) transmits, to the relay station (RN), the first RRC message (RRC Procedure) and the second RRC message (Un Configuration).

On the other hand, when setting of the first RRC message (RRC Procedure) has been completed in step S92, the flow goes to step S94.

In step S94, the relay station (RN) determines whether setting by the second RRC message (Un Configuration) has been completed. When the setting has not been completed, the flow goes to step S93, and the relay station (RN) transmits the RRC message for reconnection (RRC connection re-est) to the base station (eNB). This step corresponds to step S54 of FIG. 5 and step S73 of FIG. 7. After that, the base station (eNB) transmits, to the relay station (RN), the first RRC message (RRC Procedure) and the second RRC message (Un Configuration). On the other hand, when the setting by the second RRC message (Un Configuration) has been completed, the flow goes to step S95.

In the case where the flow goes to step S95, settings by the first RRC message (RRC Procedure) and the second RRC message (Un Configuration) have been properly made, so that setting of the logical path in the relay station (RN) completes, and the flow ends.

On the other hand, in step S91, when there are existing settings of the first RRC message (RRC Procedure) and the second RRC message (Un Configuration), the flow goes to step S96.

In step S96, the relay station (RN) determines whether setting by the second RRC message has been completed. When the setting has not been completed, the flow goes to step S93, and the relay station (RN) transmits the RRC message for reconnection (RRC connection re-est) to the base station (eNB). After that, the base station (eNB) transmits, to the relay station (RN), the first RRC message (RRC Procedure) and the second RRC message (Un Configuration). On the other hand, in step S96, when the setting by the second RRC message (Un Configuration) has been completed, the flow goes to step S95. As mentioned above, this case corresponds to operation when updating.

In the case where the flow goes to step S95, settings by the first RRC message (RRC Procedure) and the second RRC message (Un Configuration) have been properly made, so that setting of the logical path in the relay station (RN) completes, and the flow ends.

3. Setting Items

As mentioned above, in the case when the relay station (RN) is launched, the relay station (RN) receives the first RRC message (RRC Procedure) and the second RRC message (Un Configuration) to make settings, and when updating, the relay station (RN) receives the second RRC message (Un Configuration) to make settings. Therefore, in order that such operation can be realized, it is necessary to properly set the first setting information included in the first RRC message (RRC Procedure) and the second setting message included in the second RRC message (Un Configuration).

The first setting information is information common to the user apparatus (UE) and the relay station (RN). More particularly, the first setting information includes information indicating priority of a radio bearer by a logical path, information indicating usage of resources in semi-persistent scheduling (SPS), information indicating resources of a sounding reference signal (SRS), and configuration information in MAC sublayer, and the like. But the first setting information is not limited to these pieces of information. For example, information on change of a security encryption key by handover may be included in the first setting information.

The second setting information is information dedicated to the relay station (RN). More specifically, the second setting information includes system information reported to the user apparatus, and information indicating a subframe for MBSFN. System information is information transmitted by a master information block (MIB) and a system information block (SIB). The system information includes, for example, the minimum information such as system bandwidth and system frame number, information indicating cell ID, cell selection information, tracking area and the like, scheduling information for information after SIB2, configuration information of radio resources common to all user apparatuses (UE), information common to cell reselection of the same frequency and different frequency, information on cell reselection of the same frequency, information on cell reselection of different frequency and different RAT, and the like. But, the system information is not limited to these pieces of information.

Figure 10:
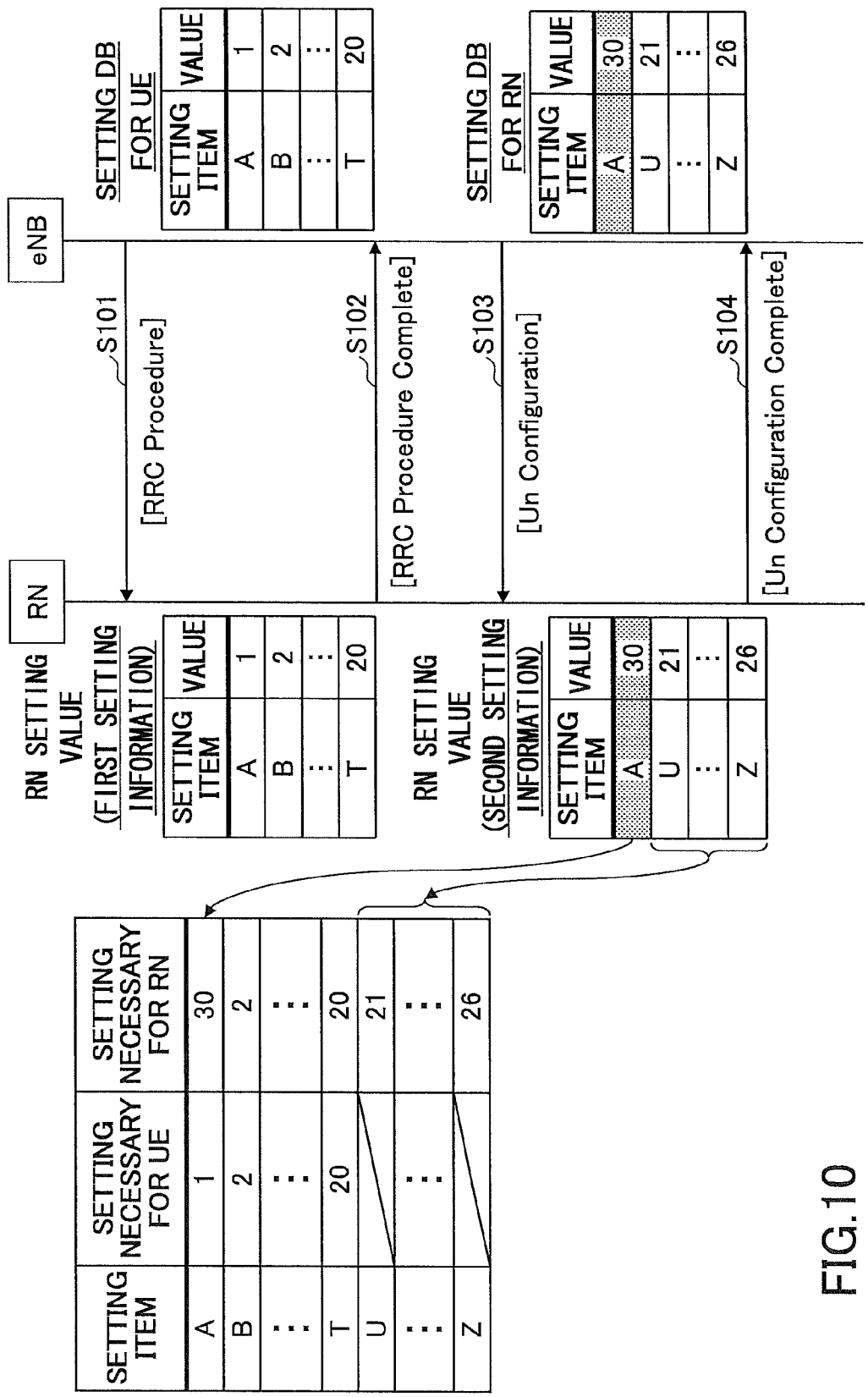
FIG. 10 is a diagram of a sequence performed between the base station (eNB) and the relay station (RN)

FIG. 10 shows a sequence performed between the base station (eNB) and the relay station (RN). Although the sequence is the same as the sequence described with reference to FIG. 2, other sequences such as ones shown in FIGS. 1 and 3 and the like may be used.

In step S101, the base station (eNB) transmits, to the relay station (RN), the first setting information common to the user apparatus (UE) and the relay station (RN) by using the individual first RRC message (RRC Procedure). The first setting information is stored in a setting database for user apparatus (setting DB for UE) of the base station (eNB). In the example shown in the figure, there are 26 items, in total, that are settable in the user apparatus (UE) and the relay station (RN). In the items, there are 20 items for the first setting information, the 20 items being represented as A, B, ... T for the sake of convenience. The value of the setting item A is 1, the value of the setting item B is 2, values are set in this manner for the following items, and the value of the setting item T is 20. The number of the setting items and the values are merely shown as examples for the sake of convenience of explanation, and any proper values may be used. The relay station (RN) sets the values of the setting items A-T according to the first setting information, so that the relay station (RN) can communicate with the base station (eNB) like the user apparatus (UE).

In step S102, the relay station (RN) reports, to the base station (eNB), that the relay station (RN) has properly received a first RRC message in step S101 by using an RRC Procedure Complete message. The report of the RRC Procedure Complete message may be performed at later timing.

In step S103, the base station (eNB) transmits, to the relay station (RN), the second setting information dedicated to the relay station (RN) by using an individual second RRC message. The second setting information is stored in a setting database for relay station (setting DB for RN) in the base station (eNB). The setting DB for UE and the setting DB for RN may be provided separately, or the setting DB for UE and the setting DB for RN may be provided by dividing one database. The relay station (RN) sets the values of the setting item A and the setting items U-Z according to the second setting information, so as to be able to communicate with the base station (eNB) as a relay station (RN). The setting item A is included in both of the first setting information and the second setting information. But, they are different in that the value is 1 in the first setting information and the value is 30 in the second setting information. In this case, setting (the value of setting item A in the second setting information) as the relay station (RN) is prioritized, so that the value of the setting item A is changed (overwritten) from 1 to 30. The setting items U-Z are not included in the first setting information for the user apparatus (UE), but are included in the second setting information for the relay station (RN). As to such items that correspond to differences of setting items, settings are added in the relay station (RN), and, as to an overlapping setting item, the value for the relay station (RN) is overwritten.

Information corresponding to the setting items A-T is information common to the user apparatus (UE) and the relay station (RN). More particularly, the information includes information indicating priority of radio bearer by a logical path, information indicating usage of resources in semi-persistent scheduling (SPS), information indicating resources of a sounding reference signal (SRS), and configuration information in MAC sublayer, and the like. But the information is not limited to these pieces of information. For example, information on change of security encryption key by handover may be included in the information. Processing for overwriting a setting item is performed not only when launching but also when updating the setting item as a matter of course.

Information corresponding to the setting items U-Z is information dedicated to the relay station (RN). More specifically, the information is system information reported to the user apparatus and information indicating a subframe for MBSFN, and the like.

In step S104, the relay station (RN) reports, to the base station (eNB), that the relay station (RN) has properly received the second RRC message (Un Configuration) in step S103 by using a Un Configuration Complete message.

As mentioned above, setting items common to the user apparatus (UE) and the relay station (RN) are reported to the relay station (RN) by the first RRC message (RRC Procedure), and the setting items dedicated to the relay station (RN) are reported to the relay station (RN) by the second RRC message (Un Configuration). By reporting the various setting items separately in this way, it is only necessary to report only the second RRC message (Un Configuration) to the relay station (RN) in the case when changing settings of the relay station (RN) after step S104. Accordingly, the sequence described with reference to FIG. 3 can be realized.

4. Base Station (eNB) and Relay Station (RN)

Figure 11:
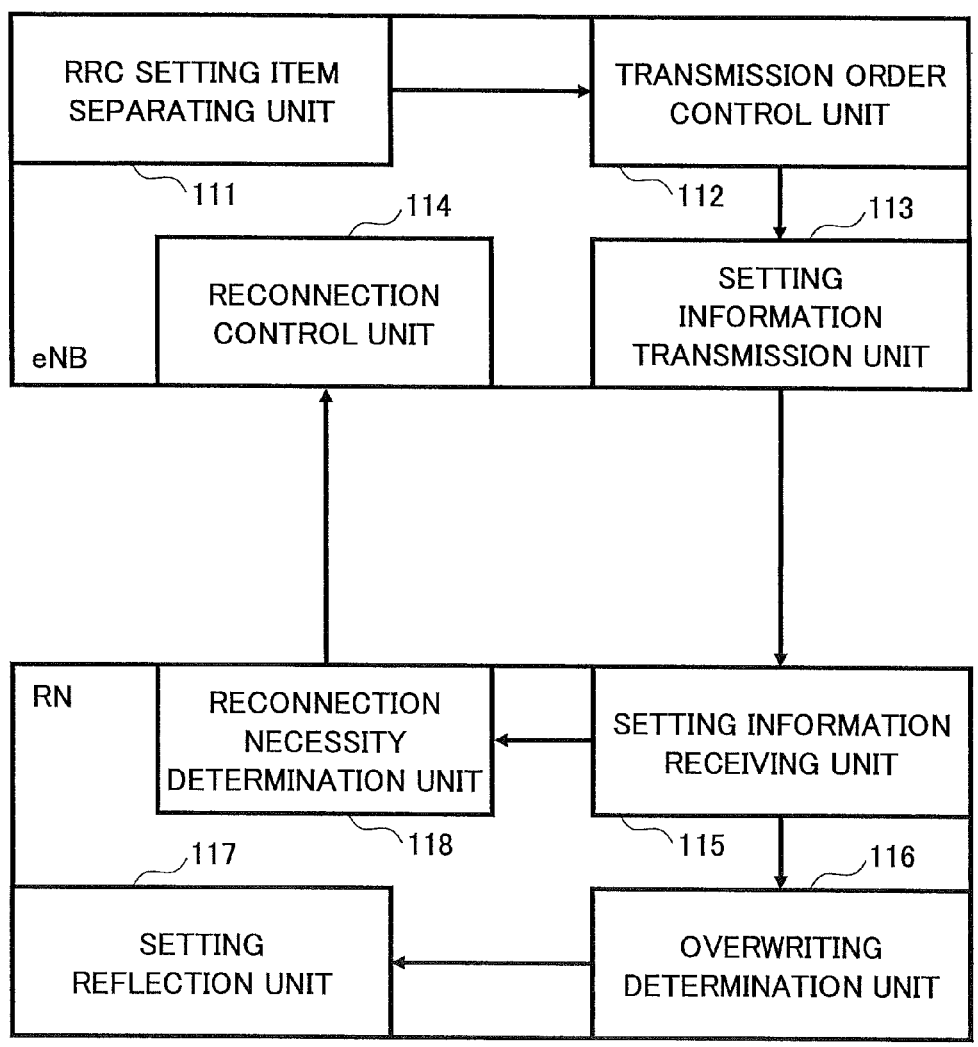
FIG. 11 is a functional block diagram of the base station (eNB) and the relay station (RN).

FIG. 11 shows a functional block diagram of the base station (eNB) and the relay station (RN). As to functional elements shown in the figure, functional elements necessary for above-mentioned various operations are shown in various functional elements included in the base station (eNB) and the relay station.

The base station (eNB) which is a donor base station (DeNB) includes, at least, an RRC setting item separating unit 111, a transmission order control unit 112, a setting information transmission unit 113, and a reconnection control unit 114. The relay station (RN) includes, at least, a setting information receiving unit 115, an overwriting determination unit 116, a setting reflection unit 117, and a reconnection necessity determination unit 118.

In the RRC setting item separation unit 111, the base station (eNB) identifies the first setting information (setting items A-T in FIG. 10) common to the user apparatus (UE) and the relay station (RN), and second setting information (setting items A, U-Z) dedicated to the relay station (RN), and outputs the first and the second setting information. The transmission order control unit 112 controls transmission order such that the second RRC message (Un Configuration) including the second setting information is transmitted after the first RRC message (RRC Procedure) including the first setting information. The setting information transmission unit 113 transmits, to the relay station (RN), the second RRC message (Un Configuration) including the second setting information after the first RRC message (RRC Procedure) including the first setting information, according to an instruction from the transmission order control unit 112.

In the relay station (RN), the setting information receiving unit 115 receives the second RRC message (Un Configuration) including the second setting information after receiving the first RRC message (RRC Procedure) including the first setting information. The overwriting determination unit 116 determines necessity of overwriting already-set setting items. The overwriting determination unit 116 is not only used in the case when determining whether to overwrite the setting item A in step S103 of FIG. 10 but also used in the case when determining whether to update a value in updating. The setting reflection unit 117 sets a value of each setting item.

On the other hand, the relay station (RN) determines, by the reconnection necessity determination unit 118, determines whether setting information is properly obtained from the received first and the second RRC messages. When the setting information is not properly obtained, the relay station (RN) transmits an RRC message (RRC connection re-est) for requesting reconnection to the base station (eNB). The base station (eNB) processes, by the reconnection control unit 114, the RRC message (RRC connection re-est) for requesting reconnection and sends an instruction to the setting information transmission unit 113 so as to retransmit the first and the second RRC messages.

In the above, the present invention has been explained while referring to the specific embodiments. However, these are merely exemplary. Those skilled in the art will conceive of various modified examples, corrected examples, alternative examples, substituted examples, and the like. Classification into each embodiment or item in the description is not essential in the present invention, and features described in two or more items may be combined and used as necessary. Subject matter described in an item may be applied to subject matter described in another item (provided that they do not contradict).

For example, when performing the processes shown in FIG. 1 in which the second RRC message (Un Configuration) is reported to the relay station (RN) after the first RRC message (RRC Procedure), the processes shown in FIGS. 6 and 7 may be used together in which the relay station (RN) transmits the RRC message for reconnection (RRC connection re-est) as necessary. In addition, dividing setting items and prioritizing setting items of the relay station (RN) described with reference to FIG. 10 may be performed when performing the processes shown in FIG. 1. Similarly, the processes shown in FIGS. 4 and 5 may be performed when performing the processes shown in FIG. 2. Further, dividing setting items and prioritizing setting items of the relay station (RN) may be performed when performing the processes shown in FIG. 2. Also, the processes shown in FIGS. 3 and 5 may be performed when performing the processes shown in FIG. 8. Further, dividing setting items and prioritizing setting items of the relay station (RN) may be performed when performing the processes shown in FIG. 3.

The present invention may be applied to any suitable mobile communication system using a relay station that relays communication between a base station and a user apparatus. For example, the present invention may be applied to systems of W-CDMA scheme, W-CDMA systems of the HSDPA/HSUPA scheme, systems of the LTE scheme, systems of the LTE-Advanced scheme, systems of the IMT-Advanced scheme, WiMAX, Wi-Fi scheme systems and the like. While specific numerical value examples are used to facilitate understanding of the present invention, such numerical values are merely examples, and any appropriate value may be used unless specified otherwise. For convenience of explanation, the apparatus according to the embodiment of the present invention has been explained by using a functional block diagram. However, the apparatus may be implemented in hardware, software, or a combination thereof. The software may be stored in any proper storage medium such as a RAM (Random Access Memory), a flash memory, a ROM (Read Only Memory), an EPROM (Erasable Programmable ROM), an EEPROM (Electronically Erasable and Programmable ROM), a register, a hard disk (HDD), a removable disk, a CD-ROM, database, server and the like.

Therefore, the present invention is not limited to the above-mentioned embodiment and is intended to include various variations, modifications, alterations, substitutions and so on without departing from the spirit of the present invention.

In the following, measures taught by the present invention are listed as examples.

(eNB1)

A base station in a mobile communication system, including:

a generation unit configured to generate first setting information commonly used for establishing a logical path for communication with a user apparatus and for establishing a logical path for communication with a relay station, and second setting information used only for establishing the logical path for communication with the relay station; and a transmission unit configured to transmit an individual second RRC message including the second setting information to the relay station after transmitting an individual first RRC message including the first setting information to the relay station.

(eNB2)

The base station as described in eNB1, wherein, after the transmission unit transmits the first RRC message to the relay station, the transmission unit transmits the second RRC message to the relay station irrespective of whether the base station receives a response signal for the first RRC message.

(eNB3)

The base station as described in eNB1, wherein, after the transmission unit transmits the first RRC message to the relay station and the base station receives a response signal for the first RRC message, the transmission unit transmits the second RRC message to the relay station.

(eNB4)

The base station as described in any one of eNB1-eNB3, wherein, after the transmission unit transmits the first RRC message to the relay station, the base station updates settings of the logical path by the second setting information by transmitting the second RRC message to the relay station repetitively.

(eNB5)

The base station as described in any one of eNB1-eNB4, wherein, in a case where the relay station fails to receive the first setting information and/or the second setting information, the base station receives an RRC message for reconnection from the relay station, and transmits the first and the second RRC message to the relay station.

(eNB6)

The base station as described in eNB5, wherein, in a case where the relay station fails to receive the first setting information, the base station receives an RRC message for reconnection from the relay station, and, in a case where the relay station fails to receive the second setting information, the base station receives the RRC message for reconnection from the relay station.

(RN1)

A relay station that communicates with a user apparatus and a base station, including:

a receiving unit configured to receive, from the base station, an individual second RRC message that includes second setting information used only for establishing a logical path for communication with the base station after receiving, from the base station, an individual first RRC message that includes first setting information commonly used for establishing a logical path for communication with the user apparatus and for establishing a logical path for communication with the base station, and a setting unit configured to establish the logical path for communication with the user apparatus and the logical path for communication with the base station according to the first setting information and to establish the logical path for communication with the base station according to the second setting information.

(RN2)

The relay station as described in RN1, wherein, the receiving unit receives the first RRC message from the base station, and, before the relay station transmits a response signal for the first RRC message to the base station, the receiving unit receives the second RRC message from the base station.

(RN3)

The relay station as described in RN1, wherein, after the receiving unit receives the first RRC message from the base station and the relay station transmits a response signal for the first RRC message to the base station, the receiving unit receives the second RRC message from the base station.

(RN4)

The relay station as described in any one of RN1-RN3, wherein, after the receiving unit receives the first RRC message from the base station, the relay station updates setting of the logical path by the second setting information by receiving the second RRC message from the base station repetitively.

(RN5)

The relay station as described in any one of RN1-RN4, wherein, in a case where the relay station fails to receive the first setting information and/or the second setting information, the relay station transmits an RRC message for reconnection to the base station, and receives the first and the second RRC message from the base station.

(RN6)

The relay station as described in RN5, wherein, in a case where the relay station fails to receive the first setting information, the relay station transmits an RRC message for reconnection to the base station, and, in a case where the relay station fails to receive the second setting information, the relay station transmits the RRC message for reconnection to the base station.

(Method 1)

A method in a mobile communication system, including the steps of:

generating, in a base station, first setting information commonly used for establishing a logical path for communication with a user apparatus and for establishing a logical path for communication with a relay station, and second setting information used only for establishing a logical path for communication with the relay station; and transmitting, from the base station, an individual second RRC message including the second setting information to the relay station after transmitting, from the base station, an individual first RRC message including the first setting information to the relay station.

(eNB1)

A base station in a mobile communication system, including:

a generation unit configured to generate first setting information commonly used for establishing a logical path for communication with a user apparatus and for establishing a logical path for communication with a relay station, and second setting information used only for establishing the logical path for communication with the relay station; and a transmission unit configured to transmit an individual second RRC message including the second setting information to the relay station after transmitting an individual first RRC message including the first setting information to the relay station, wherein the first setting information includes at least information indicating a priority of a radio bearer in the logical path, information indicating usage of resources in semi-persistent scheduling, information indicating resources of a sounding reference signal, configuration information in a MAC sublayer, and information on change of a security encryption key in handover, and the second setting information includes at least system information reported to the user apparatus and information indicating a subframe for MBSFN.

(eNB2)

The base station as described in eNB1, wherein, in a case where there is information of a setting item that is included in both of the first and the second setting information in which values of the setting item are different, a value in the second setting information is prioritized in the relay station.

(RN1)

A relay station that communicates with a user apparatus and a base station, including:

a receiving unit configured to receive, from the base station, an individual second RRC message that includes second setting information used only for establishing a logical path for communication with the base station after receiving, from the base station, an individual first RRC message that includes first setting information commonly used for establishing a logical path for communication with the user apparatus and for establishing a logical path for communication with the base station, and a setting unit configured to establish the logical path for communication with the user apparatus and the logical path for communication with the base station according to the first setting information and to establish the logical path for communication with the base station according to the second setting information, wherein the first setting information includes at least information indicating a priority of a radio bearer in the logical path, information indicating usage of resources in semi-persistent scheduling, information indicating resources of a sounding reference signal, configuration information in a MAC sublayer, and information on change of a security encryption key in handover, and the second setting information includes at least system information reported to the user apparatus and information indicating a subframe for MBSFN.

(RN2)

The relay station as described in RN1, wherein, in a case where there is information of a setting item that is included in both of the first and the second setting information in which values of the setting item are different, a value in the second setting information is prioritized in the relay station.

(Method 1)

A method in a mobile communication system, including the steps of:

generating, in a base station, first setting information commonly used for establishing a logical path for communication with a user apparatus and for establishing a logical path for communication with a relay station, and second setting information used only for establishing a logical path for communication with the relay station; and transmitting, from the base station, an individual second RRC message including the second setting information to the relay station after transmitting, from the base station, an individual first RRC message including the first setting information to the relay station, wherein the first setting information includes at least information indicating a priority of a radio bearer in the logical path, information indicating usage of resources in semi-persistent scheduling, information indicating resources of a sounding reference signal, configuration information in a MAC sublayer, and information on change of a security encryption key in handover, and the second setting information includes at least system information reported to the user apparatus and information indicating a subframe for MBSFN.

The present international application claims priority based on Japanese patent application No. 2010-181912, filed in the JPO on Aug. 16, 2010, and the entire contents of the Japanese patent application No. 2010-181912 are incorporated herein by reference.

The invention claimed is:

1. A base station in a mobile communication system, comprising:

a generation unit configured to generate first setting information commonly used for establishing a first logical path for communication with a user apparatus and for establishing a second logical path for communication with a relay station, and second setting information used only for establishing the second logical path for communication with the relay station; and a transmission unit configured to transmit an individual second radio resource control (RRC) message including the second setting information to the relay station after transmitting an individual first RRC message including the first setting information to the relay station, wherein the first setting information includes at least information indicating a priority of a radio bearer in the first or second logical path, information indicating usage of resources in semi-persistent scheduling, information indicating resources of a sounding reference signal, configuration information in a media access control (MAC) sublayer, and information on change of a security encryption key in handover, and the second setting information includes at least system information reported to the user apparatus and information indicating a subframe for Multimedia Broadcast multicast service Single Frequency Network (MBSFN).

2. The base station as claimed in claim 1, wherein, in a case where there is information of a setting item that is included in both of the first and the second setting information in which values of the setting item are different, a value in the second setting information is prioritized in the relay station.

3. A relay station that communicates with a user apparatus and a base station, comprising:

a receiving unit configured to receive, from the base station, an individual second radio resource control (RRC) message that includes second setting information used only for establishing a second logical path for communication with the base station after receiving, from the base station, an individual first RRC message that includes first setting information commonly used for establishing a first logical path for communication with the user apparatus and for establishing the second logical path for communication with the base station, and a setting unit configured to establish the first logical path for communication with the user apparatus and the second logical path for communication with the base station according to the first setting information and to establish the second logical path for communication with the base station according to the second setting information, wherein the first setting information includes at least information indicating a priority of a radio bearer in the first or second logical path, information indicating usage of resources in semi-persistent scheduling, information indicating resources of a sounding reference signal, configuration information in a media access control (MAC) sublayer, and information on change of a security encryption key in handover, and the second setting information includes at least system information reported to the user apparatus and information indicating a subframe for Multimedia Broadcast multicast service Single Frequency Network (MBSFN).

4. The relay station as claimed in claim 3, wherein, in a case where there is information of a setting item that is included in both of the first and the second setting information in which values of the setting item are different, a value in the second setting information is prioritized in the relay station.

5. A method in a mobile communication system, comprising the steps of:

generating, in a base station, first setting information commonly used for establishing a first logical path for communication with a user apparatus and for establishing a second logical path for communication with a relay station, and second setting information used only for establishing the second logical path for communication with the relay station; and transmitting, from the base station, an individual second radio resource control (RRC) message including the second setting information to the relay station after transmitting, from the base station, an individual first RRC message including the first setting information to the relay station, wherein the first setting information includes at least information indicating a priority of a radio bearer in the first or second logical path, information indicating usage of resources in semi-persistent scheduling, information indicating resources of a sounding reference signal, configuration information in a media access control (MAC) sublayer, and information on change of a security encryption key in handover, and the second setting information includes at least system information reported to the user apparatus and information indicating a subframe for Multimedia Broadcast multicast service Single Frequency Network (MBSFN).

\* \* \* \* \*